UNITED STATES PATENT OFFICE.

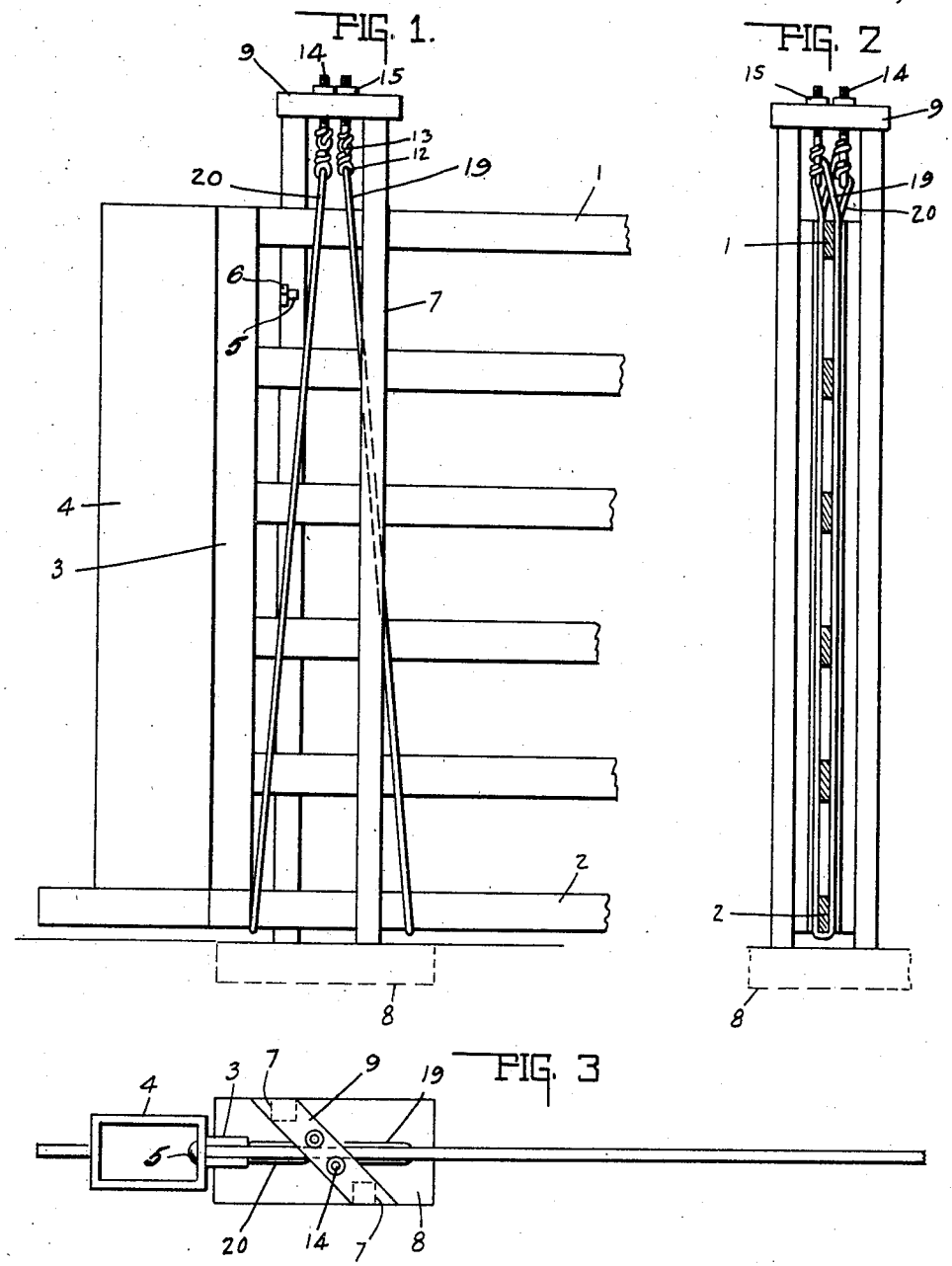

THOMAS HUSTON, OF KOKOMO, INDIANA.

FARM-GATE.

1,395,574.   Specification of Letters Patent.   Patented Nov. 1, 1921.

Application filed October 21, 1920. Serial No. 418,528.

*To all whom it may concern:*

Be it known that I, THOMAS HUSTON, a citizen of the United States, residing at Kokomo, in the county of Howard and State of Indiana, have invented certain new and useful Improvements in Farm-Gates, of which the following is a specification.

This invention relates to farm gates, and is an improvement over my former Patent No. 1,341,905, issued June 1, 1920, the prime feature of the present invention being the provision of means for suspending the gate from its supporting posts so that the entire weight and strain will be directed downwardly or vertically of the post, thereby eliminating any side or pulling strain on the post.

A further feature of the invention is the provision of means for counterbalancing the gate so that it will readily swing to open and closed position without requiring undue lifting action thereon.

A further feature of the invention is the provision of means for suspending the gate from the post whereby it will have substantially floating action, adjusting means being provided whereby the gate may be elevated to various heights above the ground thereby positioning the gate so that it may be readily opened, and when a heavy snow is on the ground the end of the gate may be manually elevated, or one end of the gate may be elevated to permit smaller animals to pass below the gate.

Other objects and advantages will be hereinafter more fully set forth and pointed out in the accompanying specification.

In the accompanying drawings, which are made a part of this application,

Figure 1 is a detail side elevation of one end of a gate structure showing a means for supporting the gate.

Fig. 2 is an end elevation thereof, and

Fig. 3 is a top plan view of the gate structure.

Referring to the drawings in which similar reference numerals designate corresponding parts throughout the several views, 1 indicates the gate structure which may be formed of any suitable material and of any general outline, the lower bar 2 of the gate structure being extended a distance beyond the rear uprights 3 of the gate so as to form a perch for a weight receiving box 4, the lower end of the box resting upon the extended portion of the bar 2. The box is attached to the end members 3 by extending a bolt 5 through one of the walls of the box and between the end members 3, a nut 6 being provided for holding the bolt in position between the end members. The gate 1 is positioned between a pair of uprights 7, one slightly forward of the other and on opposite sides of the gate, the lower ends of said uprights 7 being anchored in any suitable manner, preferably by attaching the same to a base block 8 while the upper ends of the uprights are connected by a cross bar 9. The gate 1 is suspended between the uprights 7 and from the cross bar 9 by looping wires 19 and 20 around the bars of the gate 1, the lower bar 2 resting on the looped portions of the wires. The upper ends of the wires forming the suspending loop are extended through eyes 12 and 13 respectively, of suspending bolts 14, one end of each wire being entered through eye 12 and then bent around the shank of the bolt while the opposite end of the wire is entered through the eye 13 from the opposite side of the bolt and likewise looped or bent around the shank of the bolt. The upper end of each bolt 14 is threaded and extended through the cross bar 9, a nut 15 engaging the upper end of the bolt so that the bolt may be adjusted longitudinally through the cross bar for regulating the height of the gate above the ground. After the gate has been suspended between the uprights, weight is added to the box 4, preferably by placing stones or the like therein, until the gate is practically balanced on the suspending wires 19 and 20, consequently the operation of opening and closing the gate is reduced to a minimum, as it requires but a slight lifting action at the forward end of the gate to release it, the gate remaining balanced while it is being swung to open or closed position.

As the gate has substantially floating action between the uprights, the forward end of the gate may be swung upwardly so that smaller animals may readily pass below the gate while larger animals will be prevented from passing the gate. It will likewise be seen that in the case of a heavy snow the act of swinging the gate to open or closed position will not be materially retarded as the end of the gate may be readily lifted so as to pass over the accumulation of snow. In mounting the gate in the manner shown the weight of the gate is directed vertically on the uprights, consequently the uprights will remain in a vertical position at all times as there is no lateral strain delivered thereon.

The wires 19 and 20 are more or less separated at their lower ends, each wire being connected to its own individual supporting bolt 14, both of which pass through the cross bar 9. By providing a pair of supporting wires and positioning them, as best shown in Fig. 3 of the drawings, the gate is more or less positively supported in a horizontal position, and furthermore, when the gate is swung to open position the wires 19 and 20 will be given more or less of a twist to create a torsion effect, consequently they will serve to swing the gate to closed position when the gate is released.

Having thus fully described my said invention, what I claim as new and desire to secure by Letters Patent, is:

1. A supporting means for a gate, comprising a pair of gate supporting loops in spaced relation, suspension means to which said loops are attached, said loops co-acting during the opening of the gate to maintain a rigid connection with the suspension means to create a torsion effect which aids in closing the gate.

2. A supporting means for a gate, comprising a pair of uprights, a cross bar connecting the upper ends of said uprights, a pair of bolts carried by said bar, and gate supporting loops depending from said bolts and in spaced apart relation, said loops co-acting during the opening of the gate to maintain a rigid connection with said cross bar and create a torsion effect which aids in the closing of the gate.

In witness whereof, I have hereunto set my hand and seal at Indianapolis, Indiana, this 18th day of October, A. D. nineteen hundred and twenty.

THOMAS HUSTON. [L. S.]

Witnesses:
CAREY S. FRYE,
M. L. SHULER.